United States Patent Office 2,922,798
Patented Jan. 26, 1960

2,922,798

MANUFACTURE OF HYDROXY-HALOGEN-PREGNENES

Albert Wettstein and Ernst Vischer, Basel, and Charles Meystre, Arlesheim, Switzerland, assignors to Ciba Pharmaceutical Products Inc., Summit, N.J.

No Drawing. Application September 26, 1956
Serial No. 612,110

Claims priority, application Switzerland
September 30, 1955

5 Claims. (Cl. 260—397.45)

This invention provides 11-oxygenated 14α-hydroxy Δ⁴-12α-halogen-pregnenes and functional derivatives thereof.

The compounds unsubstituted in 21-position are more powerful than progesterone in transforming the vaginal epithelium into mucus cells in the presence of estrone, and therefore can be used therapeutically in those illnesses where progesterone is indicated.

The compounds with oxygen in 21-position have cortical hormone activity; they may be used in the alleviation of symptoms associated with rheumatic and arthritic diseases.

The new Δ⁴-14-hydroxy-pregnenes are obtained in accordance with the invention by subjecting a saturated or unsaturated 11-oxygenated 14-unsubstituted 12α-halogen-pregnene to the aerobic action of an enzyme produced by fungi of the genus Mucor, Helicostylum, Pleospora or Curvularia.

The 11-oxygenated 14-unsubstituted Δ⁴-12α-halogen-, especially -12α-fluoro- and -12α-chloro-pregnene compounds used as starting materials advantageously contain in the 3- and 20-positions free or functionally converted hydroxyl or oxo groups.

They contain further double bonds, for example, in the 1-, 6-, 7-, 8-, 9- or 16-position, or may contain additional substituents such as free or functionally converted hydroxyl groups or oxo groups, and also epoxy groups or halogen atoms, for example, in the 2-, 4-, 6-, 7-, 8-, 15-, 16-, 17- or 21-position, or methyl groups, for example, in the 17α-position. The starting materials described above may be of any desired steric configuration and may be used in the form of racemates. The starting materials may also be of the so-called nor and/or homo series especially 19-nor or D-homo compounds. Especially important starting materials are for example, 12α-fluoro- and 12α-chloro-derivatives of hydrocortisone, cortisone, corticosterone, 11-dehydrocorticosterone, 11β-hydroxy- or 11-oxo-17α-hydroxy-progesterone, 11β-hydroxy- or 11-oxo-progesterone and the corresponding 1-dehydro-compounds. In the starting materials the functionally converted hydroxyl group may be, for example, a hydroxyl group esterified with an aliphatic, aromatic or heterocyclic carboxylic acid, for example, acetic acid, propionic acid, benzoic acid or furane carboxylic acid, or an etherified hydroxyl group, for example, the tetrahydropyranyloxy- benzyloxy- or triphenyl methoxy group. The functionally converted oxo group is advantageously a ketalized oxo group derived, more especially, from a dihydric alcohol, such as the ethylene-dioxy group.

The aforesaid starting materials are reacted in the process of the invention with enzymes produced by fungi of the genera Mucor, Helicostylum, Pleospora or Curvularia, and especially of the species *Mucor griseocyanus, Mucor parasiticus, Helicostylum piriforme, Pleospora gaeumanni* and *Curvularia pallescens*. In order to produce these organisms the known media may be used, for example, those containing sugar such as glucose or lactose, peptones, corn steep liquor, soya bean products or the like, and also mineral salts, or synthetic nutrient solutions. The process is carried out more especially under aerobic conditions, for example, in an agitation culture, or by submerged growth, while stirring, and with the access of air. The aforesaid moulds differ from other micro-organisms, for example, bacteria, by their good growth under relatively simple conditions of culture. The process of the invention may be carried out in a mould culture of the kind described above or with the aid of enzymes separated therefrom and, if desired, concentrated. In the simplest case it is carried out in a suspension of the separated mould mycelium, or of the homogenized mould mycelium or in a filtrate or aqueous extract thereof.

The products of the process may be isolated by methods in themselves known. They may be separated, for example, by extracting the reaction mixture with an organic solvent, for example, methylene chloride or ethyl acetate. For further purification of the extract so obtained chromatography is especially suitable, for example, chromatography over aluminum oxide or silica gel, or distribution methods may be used, for example, the counter-current method, or the separation may be carried out by means of Girard reagents, such as trimethyl-ammonium- or pyridinium-acetic acid hydrazide. Instead of or immediately following the purification recrystallization of the product, preferably from an organic or aqueous-organic solvent, may be carried out.

By introducing the 14-hydroxyl group valuable 11-oxygenated Δ⁴-14-hydroxy-12α-halogen-pregnenes and derivatives thereof are obtained, which, as compared with the therapeutically active compounds not hydroxylated in the 14-position, are distinguished by their greater activity. As oxygenated compounds and functional derivatives thereof there are to be understood those which contain free or functionally converted hydroxyl groups or oxo groups such, for example, as esters, ethers, thioesters, thioethers, thiol-esters or thion-esters, acetals, mercaptals, ketals, enol derivatives, such as enol-esters, enol-ethers or enamines, or hydrazones, semicarbazones and the like. Among the products of the process there may be mentioned, more especially, the 12α-fluoro- and 12α-chloro-derivatives of 14α-hydroxy-hydrocortisone, 14α-hydroxy-cortisone, 14α-hydroxy-corticosterone, 14α-hydroxy-11-dehydro-corticosterone, 14α-hydroxy-1-dehydro-hydro-cortisone, 14α-hydroxy-1-dehydrocortisone, 14α-hydroxy-1-dehydro-corticosterone, 14α-hydroxy-1:11-bisdehydro-corticosterone, 14α:11β-dihydroxy- and 14α-hydroxy-11-oxo-progesterone, 14α:11β:17α-trihydroxy- and 14α:17α-dihydroxy-11-oxo-progesterone, 14α:11β-dihydroxy- and 14α-hydroxy-11-oxo-1-dehydro-progesterone, 14α:11β:17α-trihydroxy- and 14α:18α-dihydroxy-11-oxo-1-dehydro-progesterone, and also functional derivatives of these compounds, such as esters and ethers. If the products of the process do not possess the configuration and substituents of therapeutically useful steroids, they can be used as intermediate products for making, for example, the compounds mentioned above.

The reaction products obtained by the process can be converted by methods in themselves known into their functional derivatives, such as oxygen, sulfur or nitrogen derivatives, for example, esters, ethers, enol-esters, enol-ethers, ketals, thioethers or thioketals, and also hydrazones, oximes or enamines. Hydroxyl groups may be dehydrogenated to oxo groups. In these compounds the hydroxyl and/or oxo groups may be completely or partially functionally converted.

In the esters and enol-esters the acid radicals are those of any desired organic or inorganic acids, such as aliphatic, aromatic, alicyclic, araliphatic or heterocyclic carboxylic acids, thion-carboxylic acids, thiol-carboxylic acids or sulfonic acids, and advantageously formic acid, acetic acid, chloracetic acids, trifluoracetic acids, propionic acid, butyric acids, valeric acids, trimethyl-acetic acid, diethyl-acetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, hydroxy-carboxylic acids, β-cyclo-pentyl-propionic acid, hexahydrobenzoic acid, benzoic acid, phenyl-acetic acid, cyclohexyl-acetic acid, phenyl-propionic acids, trimethyl-gallic acid, phthalic acid, furane-2-carboxylic acid, iso-nicotinic acid, methane sulfonic acid, toluene sulfonic acid, sulfuric acids, hydrohalic acids or phosphoric acids.

If desired functionally converted hydroxyl or oxo groups in the compounds so obtained may be converted into the free groups. In this manner, especially in polysubstituted derivatives the functionally converted groups may be partially liberated. This can be brought about, for example, by chemical or enzymatic hydrolysis, for example, with the use of an acidic or basic medium, by re-esterification or by re-acetalization. From the only partially converted, such as esterified or etherified, derivatives obtained in this manner or obtained directly, there may be prepared by subsequent functional conversion, for example, esterification or etherification, polysubstituted derivatives, especially mixed esters or ethers or ester-ethers. If during the hydrolysis, especially with an alkaline medium the 12:11-halogen-hydrin is converted into the corresponding 11:12-oxido-compound, the latter can be reconverted into the desired 12:11-halogen-hydrin by the action of a hydrohalic acid, especially hydrofluoric acid or hydrochloric acid.

The products of the invention are useful as medicaments or as intermediate products for making medicaments.

The following examples illustrate the invention:

*Example 1*

A solution of 125 milligrams of Δ⁴-3:20-dioxo-11β-hydroxy-12α-fluoro-pregnene (obtainable, for example, as described in U.S. patent application, Serial No. 606,979, filed August 30, 1956, by Albert Wettstein et al.) is added under sterile conditions to an agitation culture, which has been well developed at 28° C. and is 4 days old, of Pleospora gaeumanni in 500 cc. of aqueous beer wort of 70 percent strength containing 0.5 cc. of sperm oil. The suspension is agitated for a further 4 days at the same temperature. The mycellium is then separated and washed well with water and ethyl acetate. The combined clear solutions are extracted with ethyl acetate. The ethyl acetate solutions are washed with water, dried and evaporated in vacuo. The residue is dissolved in methanol of 80 percent strength and extracted several times with petroleum ether. The methanol solutions are evaporated completely in vacuo. The paper chromatogram (mixture of propylene glycol and toluene) of the residue indicates, in addition to a small amount of Δ⁴-3:20-dioxo-11β-hydroxy-12α-fluoro-pregnene, the somewhat slower running Δ⁴-3:20-dioxo-11β:14α-dihydroxy-12α-fluoro-pregnene. The whole residue is split up by a preparative paper chromatography (mixture of propylene glycol and toluene). The zones corresponding to the 14α-hydroxy-derivative are cut out and extracted several times with methanol of 50 percent strength. The methanol is then removed in vacuo, the residual aqueous solution is extracted several times with ethyl acetate, the combined ethyl acetate solutions are washed with water, dried and evaporated, and pure Δ⁴-3:20-dioxo-11β:14α-dihydroxy-12α-fluoro-pregnene remains behind as a residue.

The incubation of the Δ⁴-3:20-dioxo-11β-hydroxy-12α-fluoro-pregnene may be carried out in 500 cc. of a well developed aqueous culture of Curvularia pallescens, which contains the following additions: 5 grams of crude sugar, 5 grams of Difco-tryptone, 1 gram of sodium nitrate, 0.5 gram of secondary potassium ortho-phosphate, 0.25 gram of sodium sulfate, 0.25 gram of potassium chloride, 5 milligrams of iron sulfate heptahydrate, 1.25 grams of calcium carbonate and 0.5 cc. of sperm oil. The further treatment is as described above.

*Example 2*

A solution of 125 milligrams of Δ⁴-3:20-dioxo-11β:17α-dihydroxy-12α-fluoro-pregnene (obtainable, for example, as described in U.S. patent application, Serial No. 606,979, filed August 30, 1956, by Albert Wettstein et al.) in 10 cc. of acetone is added under sterile conditions to an agitation culture, which has been well developed at 28° C. and is 4 days old, of Pleospora gaeumanni in 500 cc. of aqueous beer wort of 70 percent strength and 0.5 cc. of sperm oil. The suspension is agitated for a further 4 days at the same temperature and is then worked up in the manner described in Example 1. The isolation and purification of the resulting Δ⁴-3:20-dioxo-11β:14α:17α-trihydroxy-12α-fluoro-pregnene are likewise carried out in the manner described above. The resulting 14α-hydroxy-compound travels in a paper chromatogram (mixture of propylene glycol and toluene) somewhat more slowly than the Δ⁴-3:20-dioxo-11β:17α-dihydroxy-12α-fluoro-pregnene.

Δ¹:⁴-3:20-dioxo-11β:17α-dihydroxy-12α-fluoro-pregnadiene (obtained, for example, as described in U.S. patent application, Serial No. 606,979, filed August 30, 1956, by Albert Wettstein et al.) can be converted in an analogous manner into Δ¹:⁴-3:20-dioxo-11β:14α:17α-trihydroxy-12α-fluoro-pregnadiene. The new compound travels in a paper chromatogram (mixture of propylene glycol and toluene) somewhat more slowly than the Δ¹:⁴-3:20-dioxo-11β:17α-dihydroxy-12α-fluoro-pregnadiene.

What is claimed is:

1. The Δ⁴-3,20-dioxo-11β,14α-dihydroxy-12α-fluoro pregnene.
2. The Δ⁴-3,20-dioxo-11β,14α-dihydroxy-12α-chloro pregnene.
3. The Δ⁴-3,20-dioxo-11β,14α,17α-trihydroxy-12α-fluoro-pregnene.
4. The Δ¹,⁴-3,20-dioxo-11β,14α,17α-trihydroxy-12α-fluoro-pregnadiene.
5. A member selected from the group consisting of a pregnene compound of the formula:

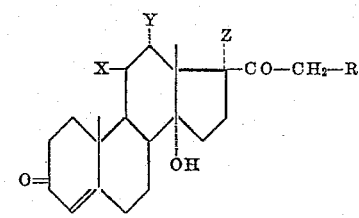

and its Δ¹-derivatives, in which X stands for a member selected from the group consisting of a β-hydroxy group and a keto group, Y stands for a member selected from the group consisting of a fluorine and a chlorine atom, Z stands for a member selected from the group consisting of a hydrogen atom and a hydroxyl group and R stands for a member selected from the group consisting of a hydrogen atom, a hydroxyl group and an O-acyl group, the acyl radical being derived from non-toxic carboxylic acids having from 1 to 11 carbon atoms.

References Cited in the file of this patent

UNITED STATES PATENTS

| | | |
|---|---|---|
| 2,602,769 | Murray | July 8, 1952 |
| 2,649,401 | Haines | Aug. 18, 1953 |
| 2,688,030 | McNiven | Aug. 31, 1954 |
| 2,773,076 | Reichstein | Dec. 4, 1956 |
| 2,800,489 | Reichstein | July 23, 1957 |